United States Patent
Chang et al.

(10) Patent No.: US 11,792,374 B1
(45) Date of Patent: Oct. 17, 2023

(54) SYSTEM AND METHOD FOR HANDLING A THERMAL COMPENSATION

(71) Applicant: HIMAX TECHNOLOGIES LIMITED, Tainan (TW)

(72) Inventors: Nai-Ting Chang, Tainan (TW); Yi-Nung Liu, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 0 days.

(21) Appl. No.: 17/986,915

(22) Filed: Nov. 15, 2022

(51) Int. Cl.
*H04N 9/31* (2006.01)

(52) U.S. Cl.
CPC ......... *H04N 9/3179* (2013.01); *H04N 9/3144* (2013.01)

(58) Field of Classification Search
CPC ...... H04N 9/3144; H04N 9/3179; H04N 9/31; G03B 21/16
USPC ............................ 348/744, 748, 749; 353/52
See application file for complete search history.

(56) References Cited

U.S. PATENT DOCUMENTS

| 2015/0124055 | A1 | 5/2015 | Kotake |
| 2018/0061056 | A1 | 3/2018 | Zhao |
| 2018/0234673 | A1 | 8/2018 | Zabatani |
| 2021/0203894 | A1* | 7/2021 | Lu ........................ H04N 9/3105 |

FOREIGN PATENT DOCUMENTS

CN 115205128 A 10/2022

* cited by examiner

*Primary Examiner* — Sherrie Hsia
(74) *Attorney, Agent, or Firm* — Winston Hsu

(57) ABSTRACT

A system for handling a thermal compensation comprises: an image capturing device comprising a capturing circuit, for capturing a first image, and a first sensing circuit, for detecting a first temperature; a projecting device comprising a second sensing circuit, for detecting a second temperature; a storage device, for storing a plurality of first parameters associated with the image capturing device, a plurality of second parameters associated with the projecting device and a reference image associated with the projecting device; and a processing device comprising a processing circuit, for compensating the first image according to the first temperature and the plurality of first parameters, to generate a first compensated image, compensating the reference image according to the second temperature and the plurality of second parameters, to generate a second compensated image, and generating a second image according to the first compensated image and the second compensated image.

20 Claims, 6 Drawing Sheets

SYSTEM AND METHOD FOR HANDLING A THERMAL COMPENSATION

BACKGROUND OF THE INVENTION

1. Field of the Invention

The present invention relates to a system and a method used in a structured light 3D system, and more particularly, to a system and a method of handling a thermal compensation of the structured light 3D system.

2. Description of the Prior Art

A structured light 3D system consists of a projecting device, an image capturing device and a processing device. The processing device generates a depth map according to a reference image associated with the projecting device and a captured image from the image capturing device. The image capturing device and the projecting device are sensitive to changes in the temperature and the component warm-up. The thermal effect leads to the distortion in the projected image of the projecting device and the pixel drifts in the captured image and the reference image. Thus, how to handle the thermal compensations on the projecting device and the image capturing device to obtain an accurate depth map is an important problem to be solved.

SUMMARY OF THE INVENTION

The present invention therefore provides a communication device and method for handling a thermal compensation to solve the abovementioned problem.

A system for handling a thermal compensation comprises: an image capturing device comprising a capturing circuit, configured for capturing a first image, and a first sensing circuit, configured for detecting a first temperature of the image capturing device; a projecting device comprising a second sensing circuit, configured for detecting a second temperature of the projecting device; a storage device, configured for storing a plurality of first parameters associated with the image capturing device, a plurality of second parameters associated with the projecting device and a reference image associated with the projecting device; and a processing device comprising a processing circuit, configured for compensating the first image according to the first temperature and the plurality of first parameters, to generate a first compensated image, compensating the reference image according to the second temperature and the plurality of second parameters, to generate a second compensated image, and generating a second image according to the first compensated image and the second compensated image.

A method for handling a thermal compensation comprises: capturing a first image; detecting a first temperature of an image capturing device; detecting a second temperature of a projecting device; storing a plurality of first parameters associated with the image capturing device, a plurality of second parameters associated with the projecting device and a reference image associated with the projecting device; compensating the first image according to the first temperature and the plurality of first parameters, to generate a first compensated image; compensating the reference image according to the second temperature and the plurality of second parameters, to generate a second compensated image; and generating a second image according to the first compensated image and the second compensated image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
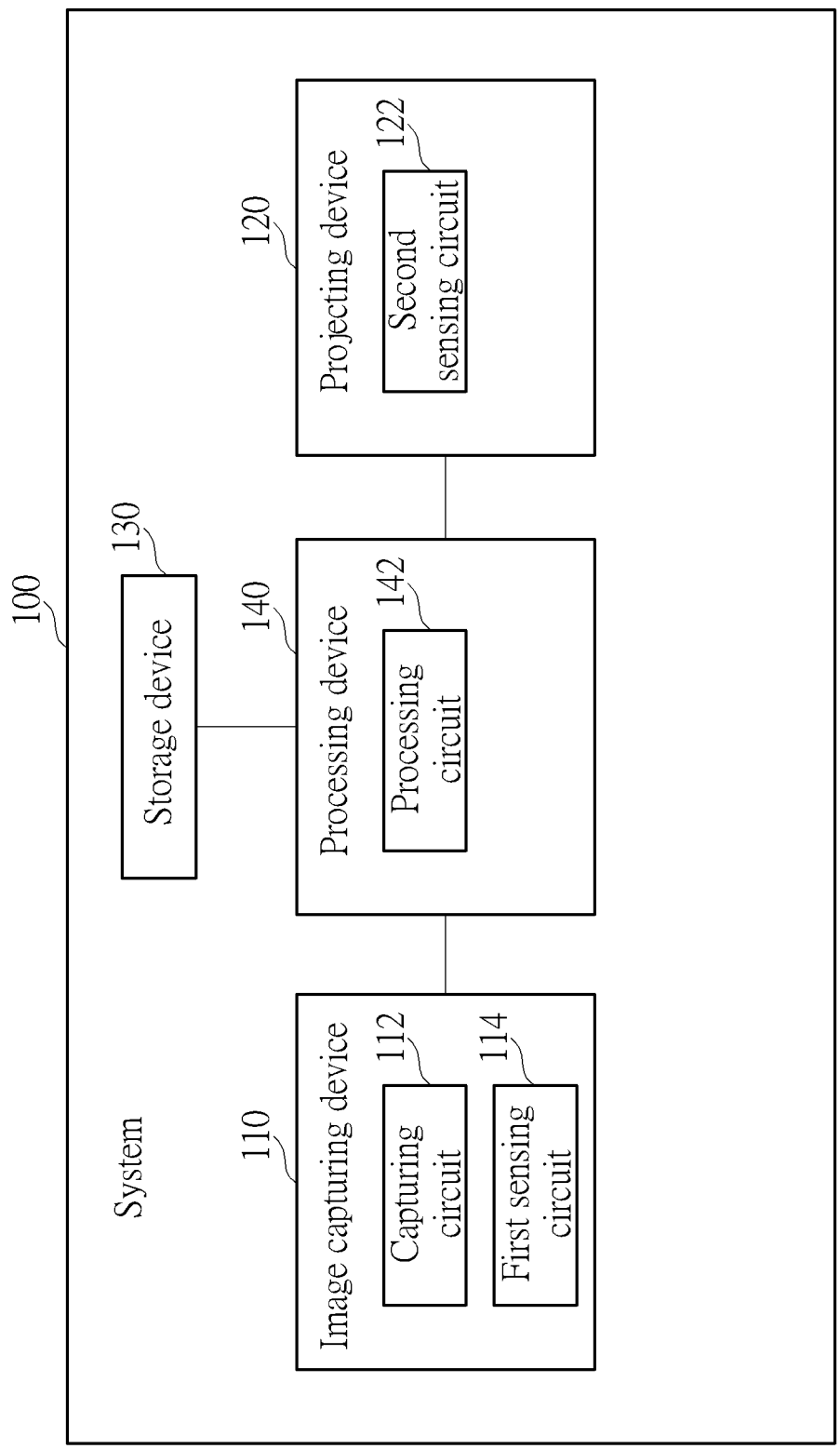
FIG. 1 is a schematic diagram of a system according to an embodiment of the present invention.

FIG. 1 is a schematic diagram of a system 100 according to an embodiment of the present invention. The system 100 may be a structured light 3D system. In FIG. 1, the system 100 comprises an image capturing device 110, a projecting device 120, a storage device 130 and a processing device 140. The image capturing device 110 comprises a capturing circuit 112 and a first sensing circuit 114. The capturing circuit 112 is configured for capturing a first image. The first sensing circuit 114 is configured for detecting (e.g., measuring) a first temperature of the image capturing device 110. The projecting device 120 comprises a second sensing circuit 122. The second sensing circuit 122 is configured for detecting (e.g., measuring) a second temperature of the projecting device 120. The storage device 130 is configured for storing a plurality of first parameters associated with the image capturing device 110, a plurality of second parameters associated with the projecting device 120 and a reference image (e.g., a ground truth image) associated with the projecting device 120. The processing device 140 is coupled to the image capturing device 110, the projecting device 120 and the storage device 130, and comprises a processing circuit 142. The processing circuit 142 is configured for compensating the first image according to the first temperature and the plurality of first parameters, to generate a first compensated image, compensating the reference image according to the second temperature and the plurality of second parameters, to generate a second compensated image, and generating a second image (e.g., a depth map) according to the first compensated image and the second compensated image.

In one embodiment, the image capturing device 110 is a monitor, a video camera, a camera or any of the above combinations, but is not limited herein. In one embodiment, the projecting device 120 is a bioscope, a projector or any of the above combinations, but is not limited herein. In one embodiment, the storage device 130 is externally connected to the processing device 140, or arranged in the processing device 140, but is not limited herein. In one embodiment, the first/second sensing circuit 114/122 is a sensor (e.g., a thermometer) for detecting a temperature of a device, but is not limited herein.

In one embodiment, the projecting device 120 further comprises a projecting circuit. The projecting circuit is configured for projecting a design image (e.g., a reference image). In one embodiment, the processing device 140 further comprises a receiving circuit. The receiving circuit is configured for receiving the first image and the first temperature from the image capturing device 110, receiving the second temperature from the projecting device 120, and receiving the plurality of first parameters, the plurality of second parameters and the reference image from the storage device 130. In one embodiment, the receiving circuit is a central processing unit (CPU) which receives (e.g., obtains, loads) data from other device/circuit, but is not limited herein.

In one embodiment, the step of compensating the first image according to the first temperature and the plurality of first parameters to generate the first compensated image comprises: generating a first interpolated image according to the first temperature and the plurality of first parameters (e.g., by using an interpolation method), and compensating the first image according to the first interpolated image, to generate the first compensated image. In one embodiment, the step of compensating the reference image according to the second temperature and the plurality of second parameters to generate the second compensated image comprises: generating a second interpolated image according to the second temperature and the plurality of second parameters (e.g., by using the interpolation method), and compensating the reference image according to the second interpolated image, to generate the second compensated image. In one embodiment, the processing circuit 142 generates the second image by using a depth decoding for the first compensated image and the second compensated image.

In one embodiment, the plurality of first parameters comprises a first relation (e.g., a table) between the first temperature and a first pixel shift of the first image. In one embodiment, the plurality of first parameters comprises a plurality of first pixel shift parameters of the first image, and the plurality of first pixel shift parameters are associated with the first temperature. In one embodiment, the plurality of first parameters comprises a plurality of first lens distortion coefficients of the image capturing device 110, and the plurality of first lens distortion coefficients are associated with the first temperature. The first relation and the plurality of first lens distortion coefficients maybe combined into a table stored by the storage device 130, but are not limited herein.

In one embodiment, the plurality of second parameters comprises a second relation (e.g., a table) between the second temperature and a second pixel shift of the reference image. In one embodiment, the plurality of second parameters comprises a plurality of second pixel shift parameters of the reference image, and the plurality of second pixel shift parameters are associated with the second temperature.

Figure 2:
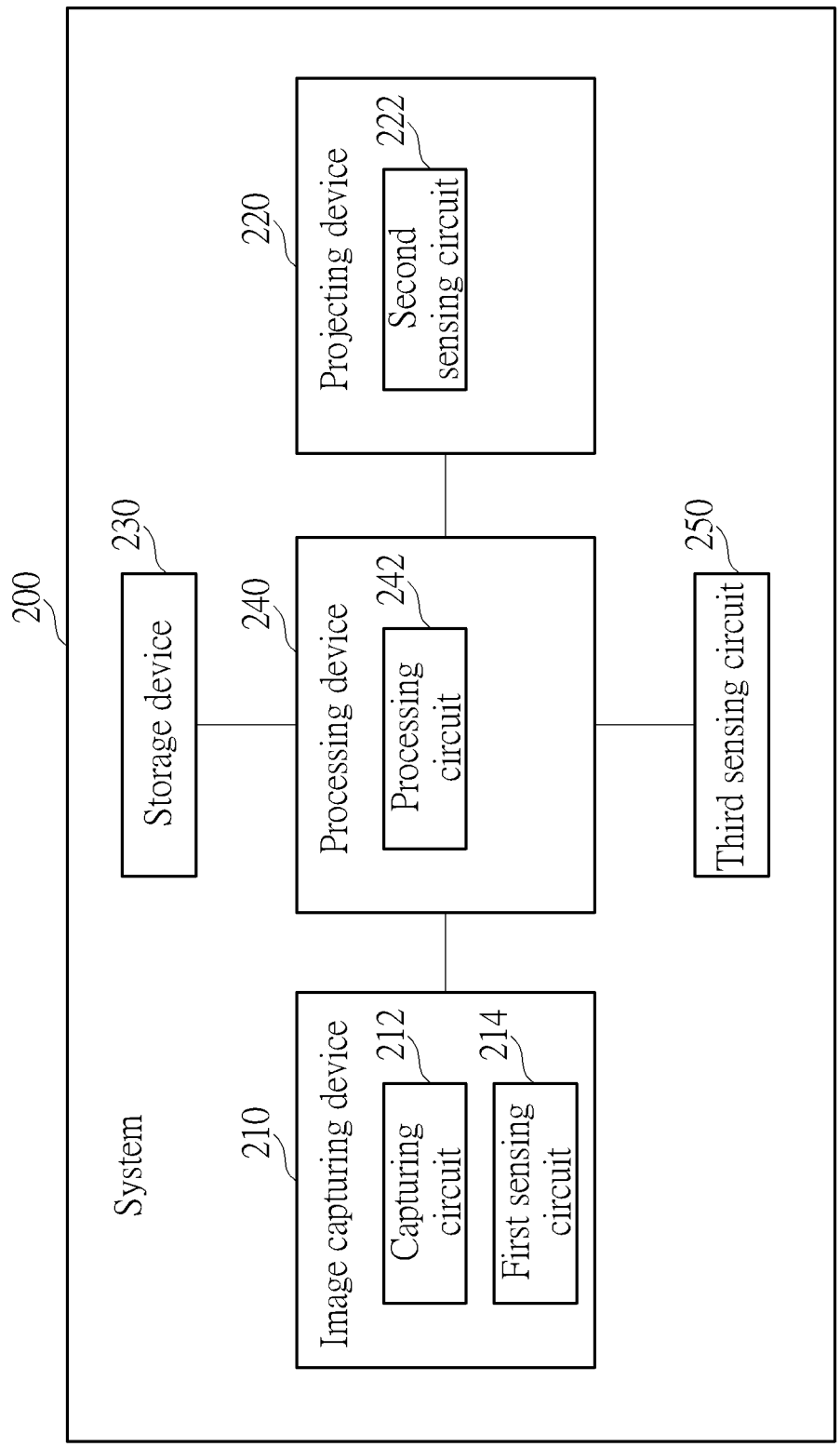
FIG. 2 is a schematic diagram of a system according to an embodiment of the present invention.

FIG. 2 is a schematic diagram of a system 200 according to an embodiment of the present invention. The system 200 may be a structured light 3D system. In FIG. 2, the system 200 comprises an image capturing device 210, a projecting device 220, a storage device 230, a processing device 240 and a third sensing circuit 250. The image capturing device 210 comprising a capturing circuit 212 and a first sensing circuit 214, the projecting device 220 comprising a second sensing circuit 222, the storage device 230 and the processing device 240 comprising a processing circuit 242 can be referred to the image capturing device 110, the projecting device 120, the storage device 130 and the processing device 140 in FIG. 1, respectively. The embodiments in FIG. 1 can be applied to FIG. 2, and are not narrated herein for brevity. In FIG. 2, the third sensing circuit 250 is configured for detecting (e.g., measuring) an ambient temperature (e.g., an environment temperature). In one embodiment, the third sensing circuit 250 is a sensor (e.g., a thermometer) for detecting the temperature, but is not limited herein.

In FIG. 2, the storage device 230 stores a plurality of third parameters associated with the image capturing device 210 and the ambient temperature, and stores a plurality of fourth parameters associated with the projecting device 220 and the ambient temperature. The processing circuit 242 compensates the first image according to the first temperature, the plurality of first parameters, the ambient temperature and the plurality of third parameters, to generate the first compensated image. The processing circuit 242 compensates the reference image according to the second temperature, the plurality of second parameters, the ambient temperature and the plurality of fourth parameters, to generate the second compensated image. Then, the processing circuit 242 generates the second image (e.g., the depth map) according to the first compensated image and the second compensated image.

In one embodiment, the plurality of third parameters comprises a third relation (e.g., a table) between the ambient temperature and a third pixel shift of the first image. In one embodiment, the plurality of third parameters comprises a plurality of third pixel shift parameters of the first image, and the plurality of third pixel shift parameters are associated with the ambient temperature. In one embodiment, the plurality of third parameters comprises a plurality of second lens distortion coefficients of the image capturing device 210, and the plurality of second lens distortion coefficients are associated with the ambient temperature. The third relation and the plurality of second lens distortion coefficients may be combined into a table stored by the storage device 230, but are not limited herein.

In one embodiment, the plurality of fourth parameters comprises a fourth relation (e.g., a table) between the ambient temperature and a fourth pixel shift of the reference image. In one embodiment, the plurality of fourth parameters comprises a plurality of fourth pixel shift parameters of the reference image, and the plurality of fourth pixel shift parameters are associated with the ambient temperature.

The above pixel shift parameters (e.g., the plurality of first pixel shift parameters, the plurality of second pixel shift parameters, the plurality of third pixel shift parameters and the plurality of fourth pixel shift parameters) may be measured by the polynomial equation(s) for the image capturing device 110/210 and/or the projecting device 120/220, but are not limited herein. The above pixel shift parameters may be measured in a chamber, but are not limited herein.

In FIG. 1, the system 100 considers the component self-heating of the image capturing device 110 and the projecting device 120, and compensates the image captured by the image capturing device 110 and the reference image associated with the projecting device 120 according to the parameters associated with the temperatures of the image capturing device 110 and the projecting device 120. In FIG. 2, the system 200 not only considers the component self-heating of the image capturing device 210 and the projecting device 220, but also considers the ambient temperature. Accordingly, the system 200 compensates the image captured by the image capturing device 210 and the reference image associated with the projecting device 220 according to the parameters associated with the ambient temperature and the parameters associated with the temperatures of the image capturing device 210 and the projecting device 220. That is, the system 100 may be realized when the ambient temperature is unchanged (e.g., the ambient temperature is a constant) or the change in the ambient temperature is negligibly small (e.g., the temperature difference is smaller than 3 degree), while the system 200 may be realized when the ambient temperature is changed (e.g., the ambient temperature is not a constant).

Figure 3:
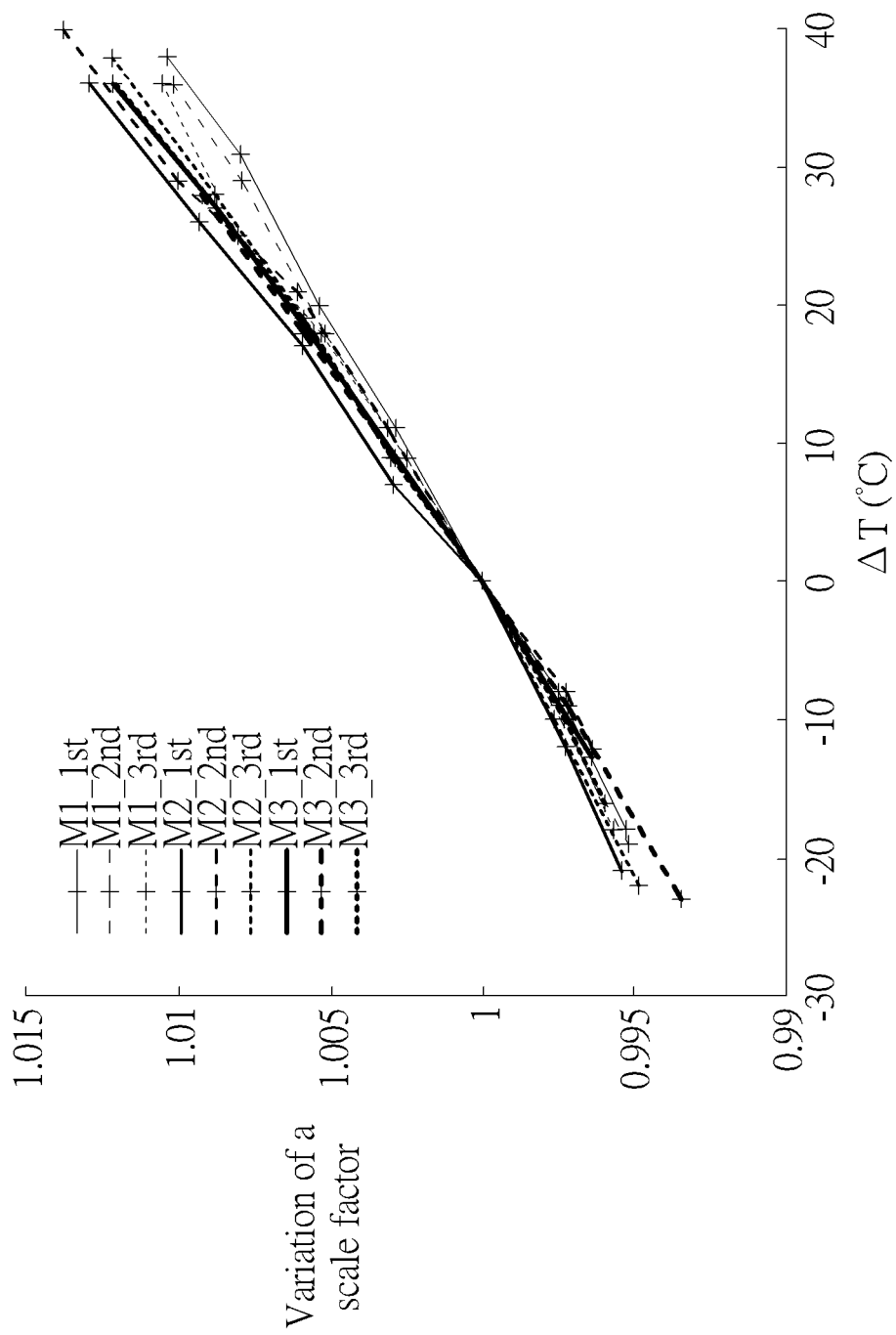
FIG. 3 is a relationship diagram between pixel shift parameters and temperatures of an image capturing device according to an embodiment of the present invention.

FIG. 3 is a relationship diagram between pixel shift parameters and temperatures of an image capturing device according to an embodiment of the present invention. FIG. 3 maybe the plurality of first parameters in FIGS. 1-2, and shows an X-axis and a Y-axis. The X-axis represents a temperature difference (AT) of a reference temperature (e.g., 20 degrees) and a temperature of the image capturing device 110/210. The Y-axis represents a pixel shift parameter (a variation of a scale factor) for the image capturing device 110/210. The pixel shift parameter is measured in a chamber according to modules M1-M3 and three times per module. The modules M1-M3 are performed via the same scale factor. The modules M1-M3 represent different conditions (e.g., different polynomial equations) for the image capturing device 110/210.

Figure 4:
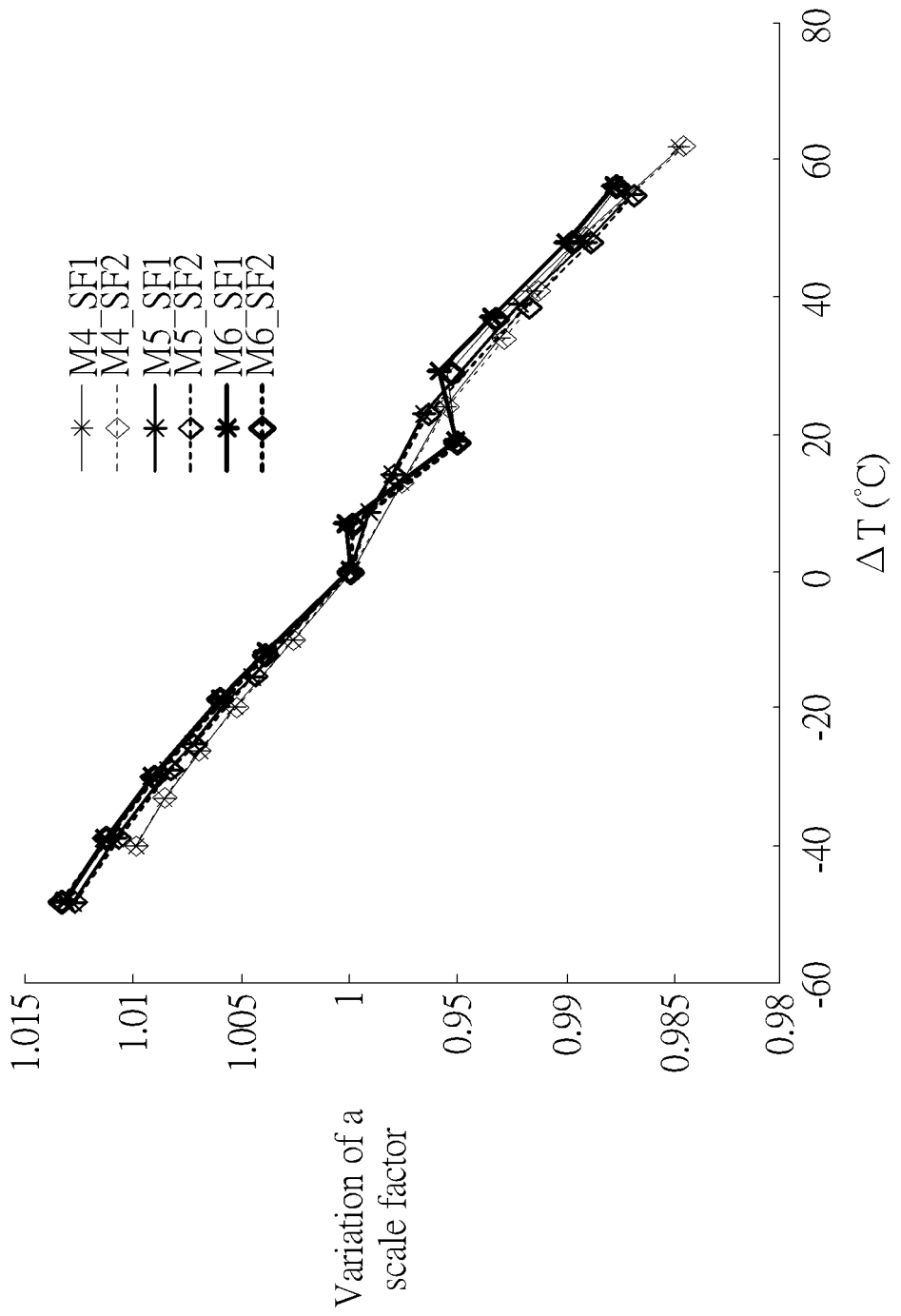
FIG. 4 is a relationship diagram between pixel shift parameters and temperatures of a projecting device according to an embodiment of the present invention.

FIG. 4 is a relationship diagram between pixel shift parameters and temperatures of a projecting device according to an embodiment of the present invention. FIG. 4 may be the plurality of second parameters in FIGS. 1-2, and shows an X-axis and a Y-axis. The X-axis represents a temperature difference (AT) of a reference temperature (e.g., 20 degrees) and a temperature of the projecting device 120/220. The Y-axis represents a pixel shift parameter (a variation of a scale factor) for the projecting device 120/220. The pixel shift parameter is measured in a chamber according to modules M4-M6, and the modules M4-M6 are performed via scale factors SF1 and SF2. The modules M4-M6 represent different conditions (e.g., different polynomial equations) for the projecting device 120/220.

Figure 5:
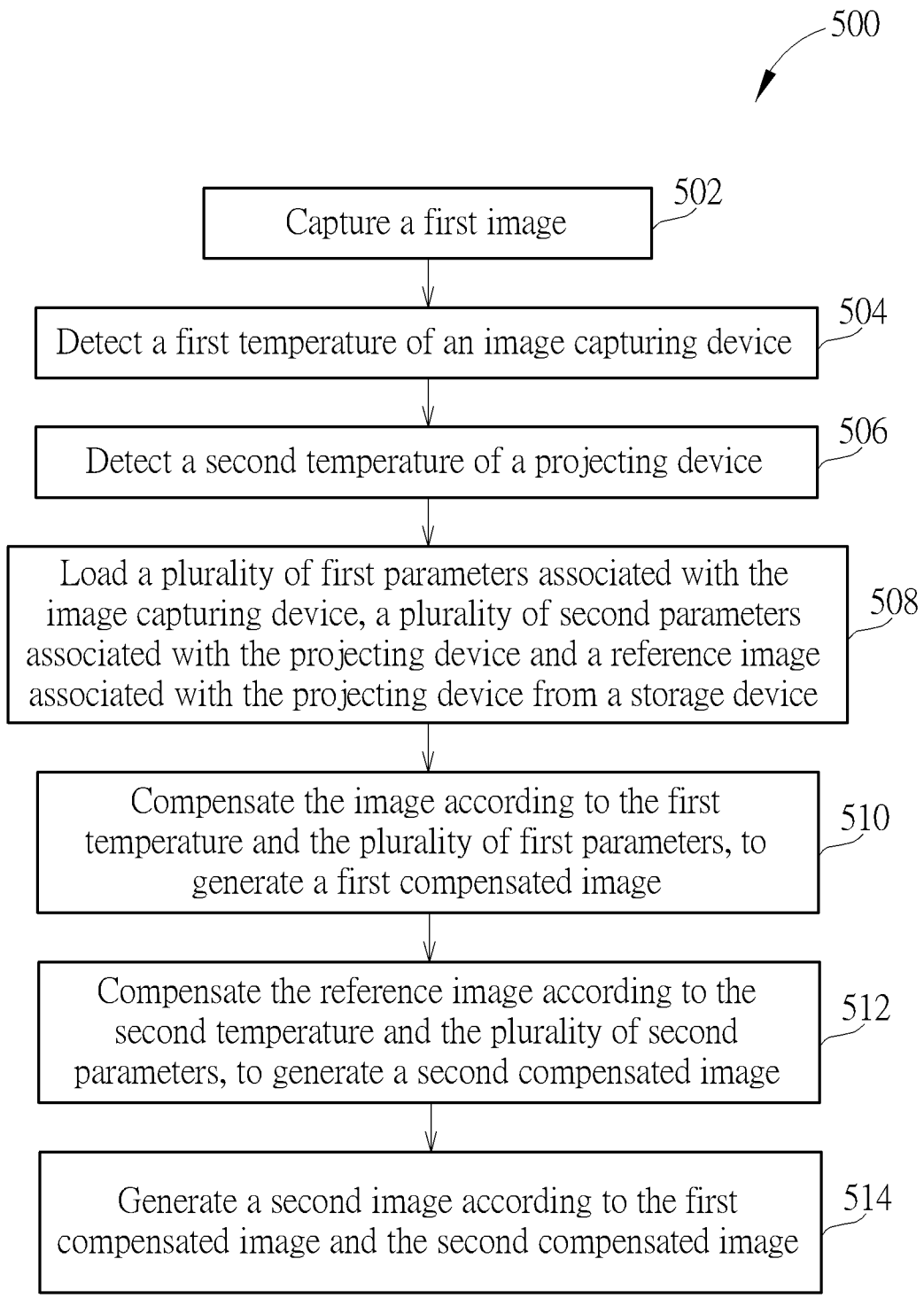
FIG. 5 is a flowchart of a process according to an example of the present invention.

FIG. 5 is a flowchart of a process 500 according to an example of the present invention, for illustrating the operations of the system 100. The process 500 includes the following steps:

Step 502: Capture a first image.

Step 504: Detect a first temperature of an image capturing device.

Step 506: Detect a second temperature of a projecting device.

Step 508: Load a plurality of first parameters associated with the image capturing device, a plurality of second parameters associated with the projecting device and a reference image associated with the projecting device from a storage device.

Step 510: Compensate the image according to the first temperature and the plurality of first parameters, to generate a first compensated image.

Step 512: Compensate the reference image according to the second temperature and the plurality of second parameters, to generate a second compensated image.

Step 514: Generate a second image according to the first compensated image and the second compensated image.

The process 500 is used for illustrating the operations of the system 100. Detailed description and variations of the process 500 can be referred to the previous description, and are not narrated herein.

Figure 6:
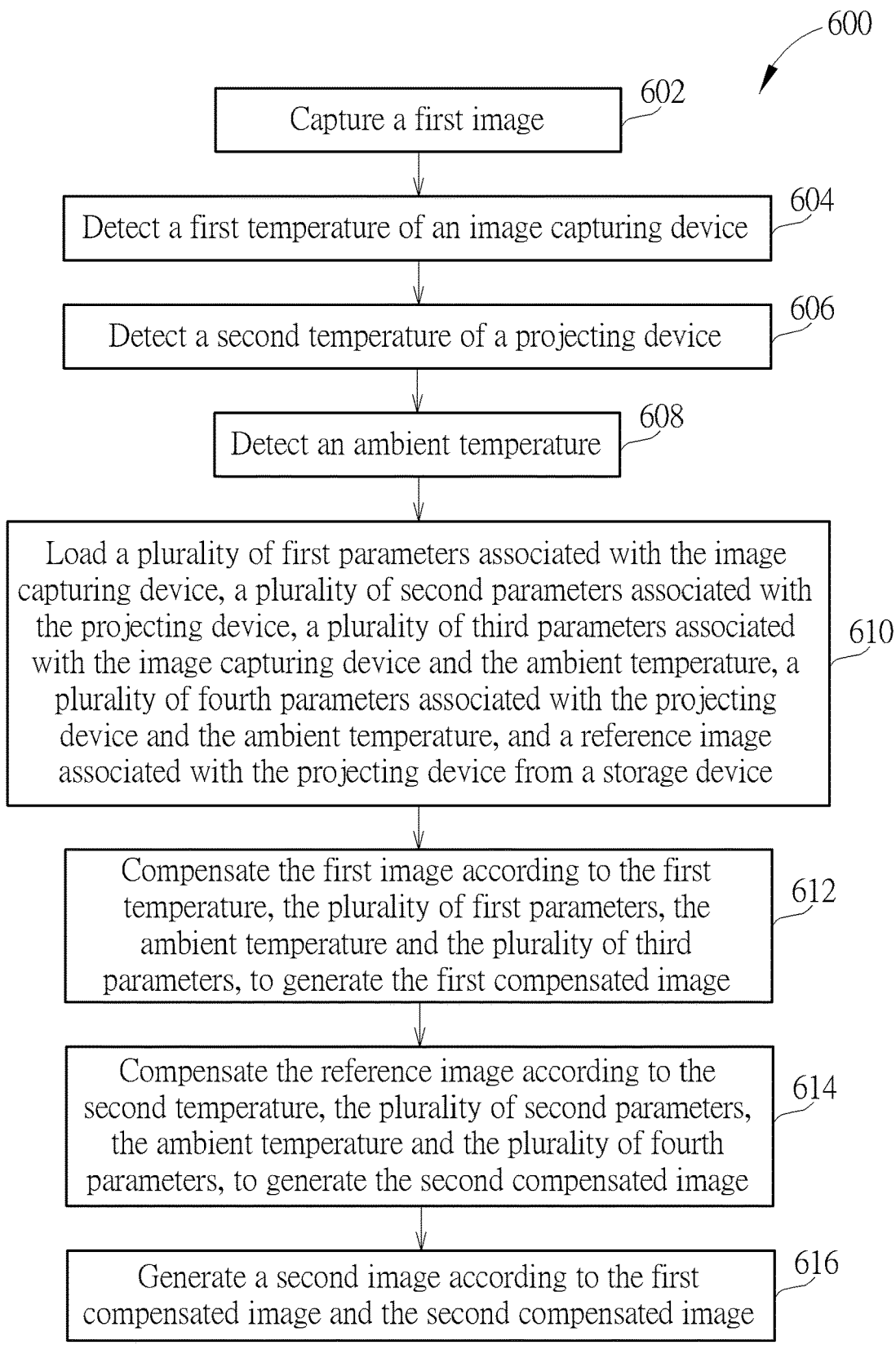
FIG. 6 is a flowchart of a process according to an example of the present invention.

FIG. 6 is a flowchart of a process 600 according to an example of the present invention, for illustrating the operations of the system 200. The process 600 includes the following steps:

Step 602: Capture a first image.

Step 604: Detect a first temperature of an image capturing device.

Step 606: Detect a second temperature of a projecting device.

Step 608: Detect an ambient temperature.

Step 610: Load a plurality of first parameters associated with the image capturing device, a plurality of second parameters associated with the projecting device, a plurality of third parameters associated with the image capturing device and the ambient temperature, a plurality of fourth parameters associated with the projecting device and the ambient temperature, and a reference image associated with the projecting device from a storage device.

Step 612: Compensate the first image according to the first temperature, the plurality of first parameters, the ambient temperature and the plurality of third parameters, to generate the first compensated image.

Step 614: Compensate the reference image according to the second temperature, the plurality of second parameters, the ambient temperature and the plurality of fourth parameters, to generate the second compensated image.

Step 616: Generate a second image according to the first compensated image and the second compensated image.

The process 600 is used for illustrating the operations of the system 200. Detailed description and variations of the process 600 can be referred to the previous description, and are not narrated herein.

It should be noted that there are various realizations of the systems 100 and 200. For example, the devices/circuits mentioned above may be integrated into one or more devices/circuits. In addition, the systems 100 and 200 may be realized by hardware (e.g., circuit), software, firmware (known as a combination of a hardware device, computer instructions and data that reside as read-only software on the hardware device), an electronic system or a combination of the devices mentioned above, but are not limited herein.

To sum up, the present invention provides a system and a method for handling a thermal compensation. The system compensates the image captured by the image capturing device according to the parameters associated the temperature of the image capturing device, and compensates the reference image associated with the projecting device according to the parameters associated the temperature of the projecting device. Further, the system may compensate the image captured by the image capturing device and the reference image associated with the projecting device according to the parameters associated the ambient temperature. Thus, the thermal compensations in the system the can be overcome to obtain an accurate depth map.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for handling a thermal compensation, comprising:
   an image capturing device, comprising:
      a capturing circuit, configured for capturing a first image; and
      a first sensing circuit, configured for detecting a first temperature of the image capturing device;
   a projecting device, comprising:
      a second sensing circuit, configured for detecting a second temperature of the projecting device;
   a storage device, configured for storing a plurality of first parameters associated with the image capturing device, a plurality of second parameters associated with the projecting device and a reference image associated with the projecting device; and a processing device, coupled to the image capturing device, the projecting device and the storage device, comprising:

a processing circuit, configured for:
compensating the first image according to the first temperature and the plurality of first parameters, to generate a first compensated image;
compensating the reference image according to the second temperature and the plurality of second parameters, to generate a second compensated image; and
generating a second image according to the first compensated image and the second compensated image.

2. The system of claim 1, wherein the projecting device further comprises:
a projecting circuit, configured for projecting a design image.

3. The system of claim 1, wherein the processing device further comprises:
a receiving circuit, configured for:
receiving the first image and the first temperature from the image capturing device;
receiving the second temperature from the projecting device; and
receiving the plurality of first parameters, the plurality of second parameters and the reference image from the storage device.

4. The system of claim 1, wherein the step of compensating the first image according to the first temperature and the plurality of first parameters to generate the first compensated image comprises:
generating a first interpolated image according to the first temperature and the plurality of first parameters; and
compensating the first image according to the first interpolated image, to generate the first compensated image.

5. The system of claim 1, wherein the step of compensating the reference image according to the second temperature and the plurality of second parameters to generate the second compensated image comprises:
generating a second interpolated image according to the second temperature and the plurality of second parameters; and
compensating the reference image according to the second interpolated image, to generate the second compensated image.

6. The system of claim 1, wherein the plurality of first parameters comprises a first relation between the first temperature and a first pixel shift of the first image.

7. The system of claim 1, wherein the plurality of second parameters comprises a second relation between the second temperature and a second pixel shift of the reference image.

8. The system of claim 1, further comprising:
a third sensing circuit, configured for detecting an ambient temperature.

9. The system of claim 8, wherein the storage device stores a plurality of third parameters associated with the image capturing device and the ambient temperature, and stores a plurality of fourth parameters associated with the projecting device and the ambient temperature.

10. The system of claim 9, wherein the processing circuit compensates the first image according to the first temperature, the plurality of first parameters, the ambient temperature and the plurality of third parameters, to generate the first compensated image.

11. The system of claim 9, wherein the processing circuit compensates the reference image according to the second temperature, the plurality of second parameters, the ambient temperature and the plurality of fourth parameters, to generate the second compensated image.

12. A method for handling a thermal compensation, comprising:
capturing a first image;
detecting a first temperature of an image capturing device;
detecting a second temperature of a projecting device;
storing a plurality of first parameters associated with the image capturing device, a plurality of second parameters associated with the projecting device and a reference image associated with the projecting device;
compensating the image according to the first temperature and the plurality of first parameters, to generate a first compensated image;
compensating the reference image according to the second temperature and the plurality of second parameters, to generate a second compensated image; and
generating a second image according to the first compensated image and the second compensated image.

13. The method of claim 12, further comprising:
projecting a design image.

14. The method of claim 12, wherein the step of compensating the first image according to the first temperature and the plurality of first parameters to generate the first compensated image comprises:
generating a first interpolated image according to the first temperature and the plurality of first parameters; and
compensating the first image according to the first interpolated image, to generate the first compensated image.

15. The method of claim 12, wherein the step of compensating the reference image according to the second temperature and the plurality of second parameters to generate the second compensated image comprises:
generating a second interpolated image according to the second temperature and the plurality of second parameters; and
compensating the reference image according to the second interpolated image, to generate the second compensated image.

16. The method of claim 12, wherein the plurality of first parameters comprises a first relation between the first temperature and a first pixel shift of the first image.

17. The method of claim 12, wherein the plurality of second parameters comprises a second relation between the second temperature and a second pixel shift of the reference image.

18. The method of claim 12, further comprising:
detecting an ambient temperature;
storing a plurality of third parameters associated with the image capturing device and the ambient temperature; and
storing a plurality of fourth parameters associated with the projecting device and the ambient temperature.

19. The method of claim 18, further comprising:
compensating the first image according to the first temperature, the plurality of first parameters, the ambient temperature and the plurality of third parameters, to generate the first compensated image.

20. The method of claim 18, further comprising:
compensating the reference image according to the second temperature, the plurality of second parameters, the ambient temperature and the plurality of fourth parameters, to generate the second compensated image.

* * * * *